United States Patent [19]

Langecker

[11] 3,728,063
[45] Apr. 17, 1973

[54] BLOWING MACHINE FOR PRODUCING HOLLOW BODIES, PARTICULARLY BOTTLES

[76] Inventor: Erhard Langecker, Hohbuschener Weg 5, Meinerzhagen/Westphalia, Germany

[22] Filed: Apr. 23, 1971

[21] Appl. No.: 136,784

[52] U.S. Cl. ............ 425/326 B, 425/387 B, 264/40, 264/98, 73/49.2
[51] Int. Cl. ............ B29c 5/06, B29c 6/04
[58] Field of Search ............ 425/5, 184, 326 B, 425/387 B; 264/40, 98, 99; 73/40, 41, 49.2

[56] References Cited

UNITED STATES PATENTS

| | | | |
|---|---|---|---|
| 3,247,707 | 4/1966 | Tatro | 73/49.2 |
| 3,464,085 | 9/1969 | Burke et al. | 425/326 B X |
| 3,577,291 | 5/1971 | Uchida | 264/98 X |
| 3,690,803 | 9/1972 | Pechtold et al. | 425/387 B |

FOREIGN PATENTS OR APPLICATIONS 1,500,861   10/1967   France ...................... 264/40

*Primary Examiner*—R. Spencer Annear
*Attorney*—Watson, Cole, Grindle & Watson

[57] ABSTRACT

In apparatus for producing hollow bodies in which a tubular-shaped blank is inflated in a mould within mould closure means alongside an extruder, characterized in that the mould closure means is provided with a blowing mould wherein said blank is inflated, test means for a leakproof test on a hollow body and preferably additional means for filling a satisfactorily tested hollow body, said blowing mould, said test means and said filling means each consisting of two halves, said halves being simultaneously movable between an open position and a closed position by said mould closure means, said blowing mould, said test means and said filling means being at equal distances from one another, and in that carrier means movable in relation to said closure means is provided on a transverse member over said closure means, said carrier means being provided with a blower nozzle a test nozzle and a filling nozzle situated in spaced relationship on the carrier means said spacing corresponding to the spacing of said blowing mould, test means and filling means, said blower nozzle being adapted to move a hollow body from said blowing mould to said test mould and said test nozzle being adapted to transfer a satisfactorily tested body to said filling means, when said halves are in the open position.

13 Claims, 5 Drawing Figures

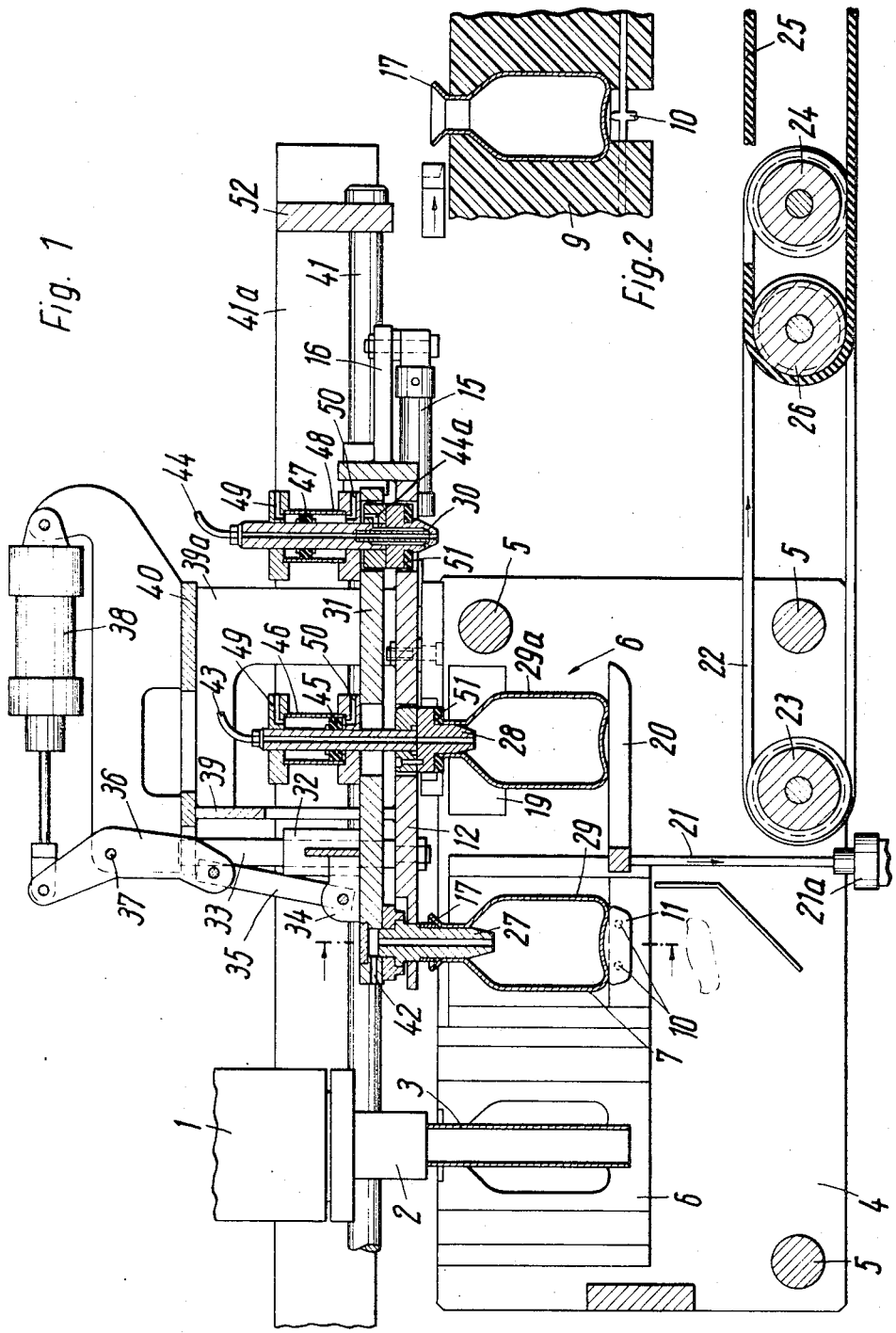

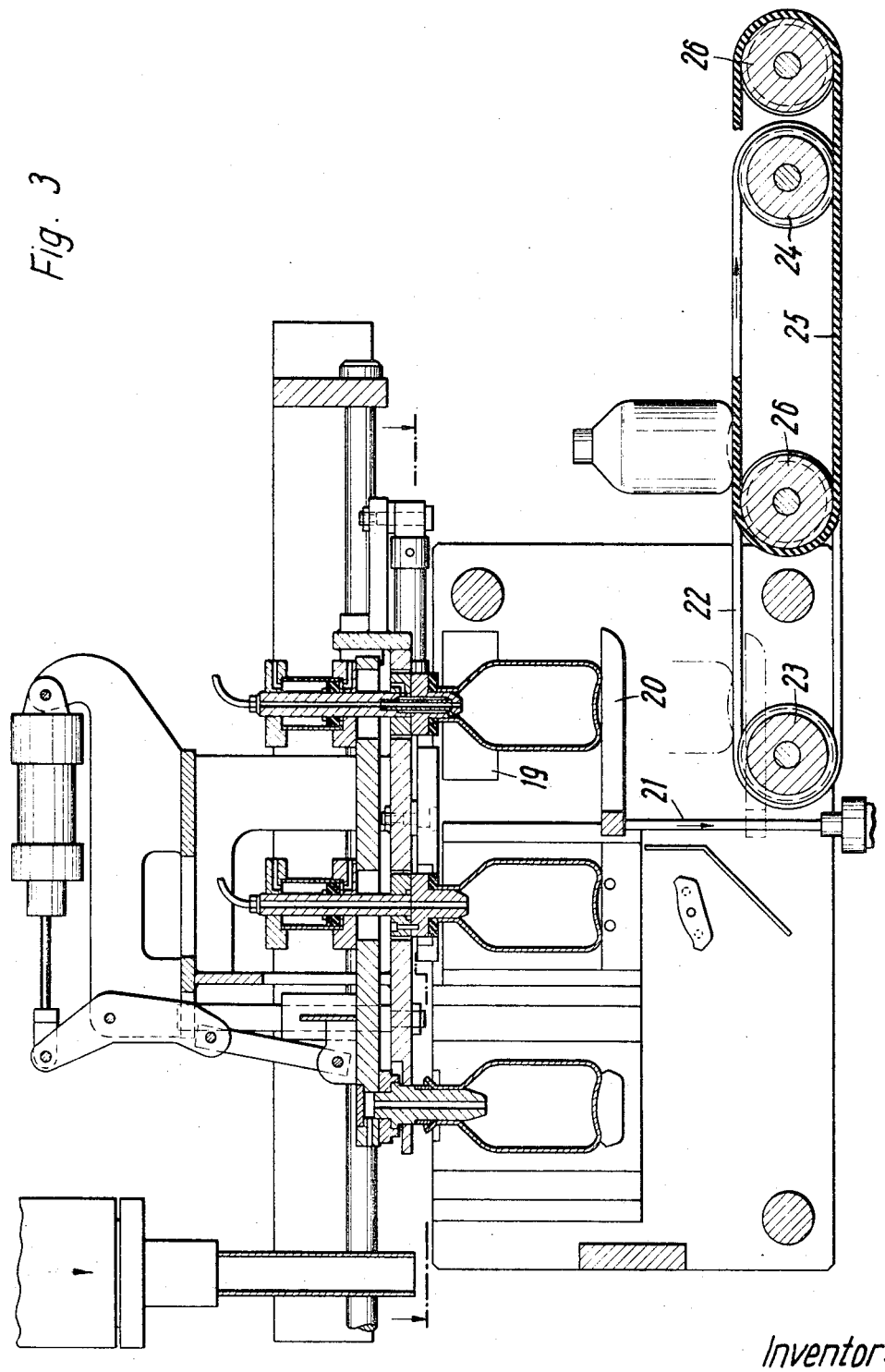

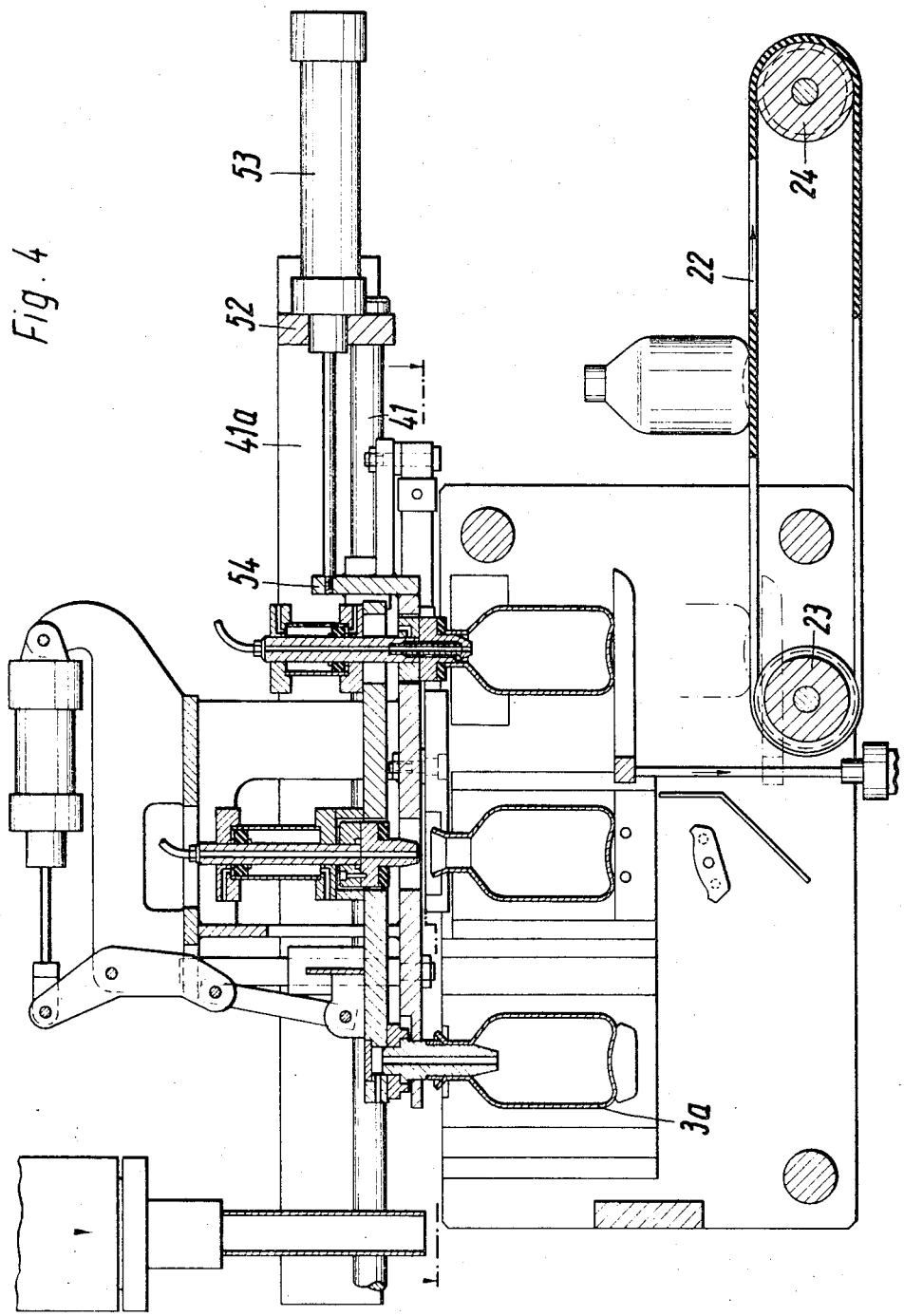

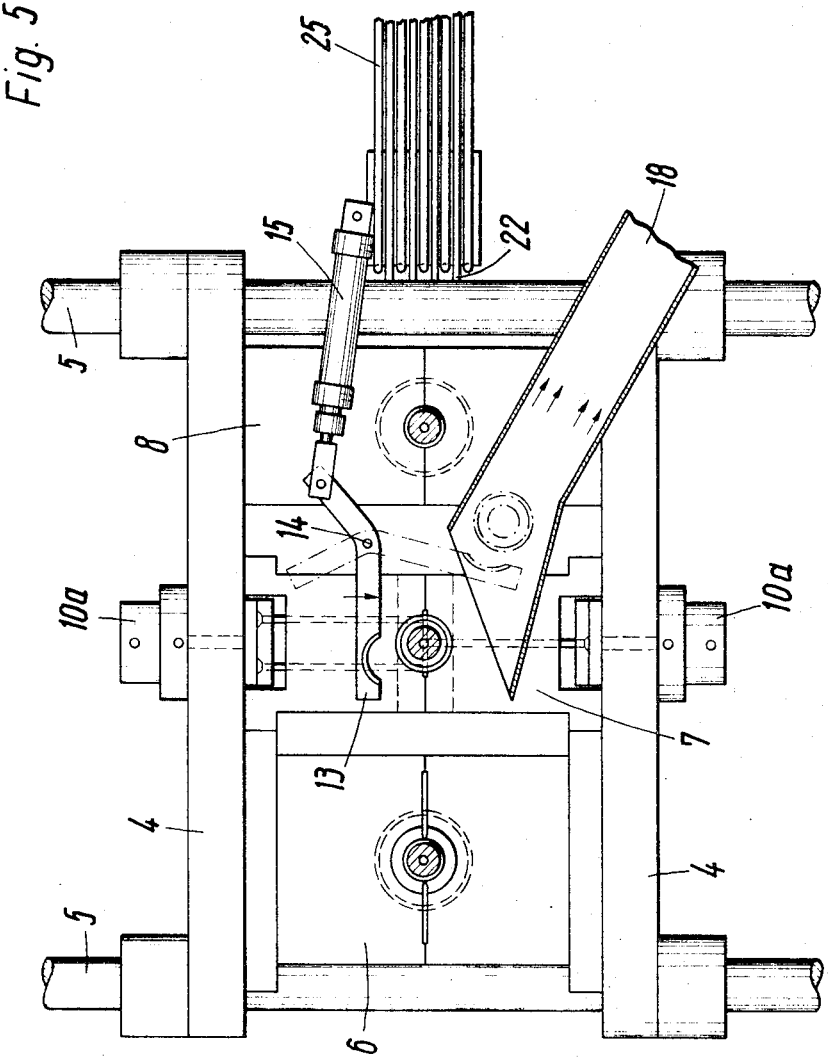

BLOWING MACHINE FOR PRODUCING HOLLOW BODIES, PARTICULARLY BOTTLES

The invention relates to a blowing machine for producing hollow bodies, particularly bottles.

Blowing machines are known in which a bottle is produced by inflation of a hose-shaped blank in a mould disposed adjacent the extruder. In these known machines, the mould is either movable in relation to a fixed hose nozzle, or conversely, the hose nozzle is adapted for movement in respect of a fixed mould. The hollow bodies produced by these machines are ejected from the mould, the label identifying the contents, or some appropriate inscription, being applied to the bottle during the blowing process. The finished bottles are, if they are to be filled, first fed to a testing apparatus which establishes whether or not the bottle is leak-proof, and by which a leaky bottle may be rejected. The tested bottles are then transferred to a filling station where they are filled with a liquid or other substance.

By virtue of these methods, considerable space is required by the various machines or apparatus for carrying out the separate operations of inflation, testing and filling of the bottles; furthermore, during transport from the blowing machine to the testing apparatus and the filling apparatus, additional transport means is necessary which occupies further space. Furthermore, by using three different forms of apparatus for producing, testing and filling the bottle, the economic aspects are adversely affected, since both the testing apparatus and the filling apparatus have to be loaded by hand in order to bring the bottles which are to be treated into the correct position for treatment by the testing and filling apparatus respectively. If this loading is automated, complicated and involved additional forms of apparatus are necessary.

The invention is based on the problem of reducing the hitherto necessary space requirement to the absolute minimum, in rendering superfluous machines required for testing and filling and to avoid the use of transport routes and equipment for loading and intermediate storage between individual stages of treatment of the bottles.

According to the invention, this is achieved in that the mould closing apparatus of the blowing machine has not only the blowing mould but also a receiving apparatus consisting of two halves and serving on the one hand to test the tightness of the product and preferably a further receiving apparatus serving for filling of the hollow body, the blowing mould and the receiving apparatuses being at the same axial distances in respect of one another, and in that a carrier movable in relation to the closing apparatus is provided which has the blower nozzle, a test nozzle and preferably a filling nozzle, the blower nozzle bringing the blown bottle into the receiving apparatus for the leakproof test and the test nozzle carrying the satisfactory bottle in the receiving apparatus for filling while the mould is opened.

The blowing machine of the invention combines in its mould closure means the blowing of the bottle, including any application of a label, the testing and the filling of the bottle in one single machine, so that the use of the hitherto known necessary plurality of machines is avoided and transport and intermediate storage between the individual machines are no longer necessary. Bottles of non-circular cross-section may be held in a constant and unchanged position in the blowing mould, in the test apparatus and in the filling apparatus during testing and filling, since transport of the bottles always necessarily takes place in the same manner, by reason of the machine. The bottle leaving the blowing machine according to the invention is ready for despatch save for application of a closure cap or the welding together of the neck opening. By blowing, testing and filling the bottle in one single machine, continuous operation is obtained without any interruption by intermediate transport, so that economy is substantially enhanced.

The carrier, with its nozzle and filling nozzle is movable in a vertical direction as a whole, and the test nozzle and filling nozzle are additionally held in the carrier in such a way as to be individually vertically movable. Upon commencement of a working cycle, the mould closure device opens the blowing mould, the test apparatus and the receiving apparatus for filling. When a base-shaped blank has been lowered into the blowing mould, the mould closure means is closed and the carrier moved laterally in relation to the mould closure means and is lowered, the blowing nozzle being received into the tubular blank which is accommodated in the closed mould; upon lowering of the carrier, the test nozzle is first lifted so that the neck waste can be removed from the bottle contained in the test apparatus. When this has happened, the test nozzle is introduced into the neck aperture and the test process carried out, in that via the test nozzle, the bottle is subjected to over-pressure in order to test for tightness and then to negative pressure for the purpose of onward transport. If the over-pressure does not persist in the bottle, due to a leak, the bottle is not subjected to negative pressure but, when the mould closure means is opened, is ejected downwardly by a surge of compressed air. The filling nozzle and simultaneously the blowing nozzle are received into the neck aperture of the bottle which is to be filled and which is held in the filling apparatus; once the filling process is completed, the mould closing means is opened and the filled bottle is lowered onto a conveyor belt. Before the carrier is displaced laterally, the filling nozzle is raised so that it can pass the upper stem of the mould closure means. Thus, one working cycle is completed. The completely blown bottle is now located in the test apparatus and the tested bottle is in position in the filling apparatus. The mould closure means is then closed and the carrier moved upwardly, the two nozzles emerging from the bottles; thereupon, the carrier is moved laterally in the opposite direction when once again the blower nozzle enters a fresh blank which has been received into the blower mould and the test nozzle, after removal of the neck waste is inserted into the bottle which is to be tested and the filling nozzle is inserted into the tested bottle which is to be filled.

On the receiving apparatus for the leakproof test, there is a device for removing the bottom waste. If the bottle is to be provided with a label during the blowing operation, then it is essential that the means for removing the waste be disposed in the test apparatus, as otherwise an application of the label in the blowing mould itself would not be possible if the waste were removed in this blowing mould. This is particularly necessary in the case of bottles which are provided with a handle, in which, in addition to the bottom waste, it is also necessary to remove the waste located at the shoulder, inside the handle, by means of the pin members staggered in respect of one another and provided in both halves of the apparatus. Removal of the neck waste and of the other waste parts takes place simultaneously, so that testing of the bottle proceeds when the waste parts are removed.

The carrier is guided on vertical struts and can be moved vertically by a piston-cylinder arrangement. The piston-cylinder arrangement engages on the bearing guides of the carrier on the struts and moves the carrier vertically upwards and downwards.

The shank of the test nozzle and of the filling nozzle are each mounted on a piston of a piston-cylinder arrangement. This arrangement serves for the necessary separate vertical movement of the test nozzle and of the filling nozzle.

The receiving means for the leakproof test has a porous material inner lining which encloses the blown bottle. Since, prior to carrying out the tightness test, the test nozzle, in order to allow separation of the neck waste, is as yet not located in the neck aperture, the interlining provided according to the invention ensures an accurately central positioning in the test apparatus of the bottle which is to be tested. The porous inner lining permits on the one hand dissipation of the test pressure in the case of a leaky bottle, while on the other hand it allows the use of a high test pressure since the interlining prevents deformation of the bottle.

The receiving means has, for filling of the bottle, jaws which brace the neck portion thereof, and in that a lowerable fork supporting the bottom of the hollow body is provided which lowers the filled hollow body onto a conveyor belt consisting of cords. During filling, the bottom of the bottle rests on the fork while the jaws grip the neck portion of the bottle and guarantee perfect insertion of the filling nozzle. After completed filling and upon opening of the mould closure means, the fork is lowered so that it engages the conveyor belt which takes over and transports away the filled bottle.

Beneath the carrier there is a support plate serving as a mounting for the apparatus for removing the neck waste. The support plate simultaneously carries the actuating means for the vertical upwards and downwards movement of the carrier and carries on its underside the means for separating the neck waste and which according to the invention consists of an arm which is pivotable about a spindle mounted on the support plate. The separated neck waste is carried away through a suction tube.

If the mould closure means is movable in a horizontal plane, the carrier and the extruder are fixed in a horizontal direction. If, however, the mould closure means is constructed to be stationary, then both the extruder and also the carrier must be movable in a horizontal plane. In the case of such a machine with a fixed mould closure means, the invention is further characterized in that the support plate is mounted displaceably on horizontal struts. In the event that the label is not applied to the bottle during the blowing operation, then it is possible to provide between the test apparatus an additional device serving to apply an adhesive label. Since, in the case of the machine of the invention, the bottles are always moved in the same position in respect to the individual apparatuses, application of the label to always the same place is reliably guaranteed.

By way of example, embodiments of the invention are illustrated in the attached drawings, in which:

FIG. 1 is a view of the machine according to the invention, with a transversely movable mould closure means, in which a tubular blank which is to be inflated is held in the closed blower mould;

FIG. 2 is a vertical partial section through the test apparatus according to FIG. 1 prior to removal of the neck waste;

FIG. 3 is a view according to FIG. 1 with the blank inflated by the blower nozzle in the blower mould;

FIG. 4 is a view of the machine according to the invention, with a fixed mould closure means according to FIG. 3; and FIG. 5 is a plan view of the mould closure means with the device for removing the neck waste.

The blowing machine is not shown as a whole in the drawings; instead, only the extruder 1 is shown with its hose nozzle 2, while the mould closure means in FIG. 5 is indicated by the mould carrier plates 4 carrying the two mould halves; the mould carrier plates 4 are movable in respect of each other on the struts 5 for opening and closing the halves of the apparatuses held between them. The two halves of the blower mould, alongside them the two halves of a test apparatus and alongside the two halves of a filling apparatus are so mounted on the two mould carrier plates that the reciprocal axial spacings between the individual devices are equal to one another. As FIG. 2 shows, the halves of the test apparatus 7 have interlinings 9 which consist of porous material to allow on the one hand accurate fixing of the bottle 29 in the test apparatus 7, and, upon application of the test pressure, to prevent deformation of the bottle while at the same time, in the case of a leaky bottle, allowing escape of the test pressure so that a leaky bottle 29 can be rejected.

Disposed in both halves of the test apparatus 7 are reciprocally staggered separating pins 10 which — as shown in FIG. 5 — are operated by the piston-cylinder arrangements 10a when the mould is closed and prior to testing of the bottle. The separating pins 10 remove the bottom waste 11 from the bottle 29. Above the mould closure means 4,5 there is a support plate 12 on the underside of which there is a striker 13 which can be pivoted with a piston-cylinder arrangement 15 about a pivot point 14 from an extended inoperative position into an operating position which is shown by dash-dotted lines. One end of the piston-cylinder arrangement 15 is secured by a tie-member 16 to the support plate 12, while the other end engages the free end of the striker 13. When the striker 13 is operated by the piston-cylinder arrangement 15, the neck waste 17 on the bottle 29 is separated and passed into an extractor pipe 18 by which it is removed from the mould closure means.

The apparatus 7 for tightness testing has two jaws 19 which engage around the neck portion of the bottle 29 which is located in the filling apparatus 8 and secure the bottle in its position. The bottom of the bottle 29 is supported by a fork 20 which can be raised and lowered by an operating rod 21 and a piston-cylinder arrangement 21a. After completed filling, the bottle 29 is lowered by this fork 20 onto a conveyor belt 22 which is guided as an endless belt over rollers 23, 24 and which consists of a plurality of cords disposed at intervals from one another, as shown in FIG. 5. In the case of the embodiment shown in FIGS. 1 to 3, a second conveyor belt 25 is provided which likewise consists of cords and which engages between the cords of the conveyor belt 22; it is guided over rollers 26. Accommodated on a carrier 21 disposed above the support plate 12 are the blower nozzle 27, a test nozzle 28 and a filling nozzle 30. The carrier 31 has a cylindrical bearing 32 which is guided on vertical struts 33. Mounted on the upper side of the carrier 30 is an eye 34 on which an intermediate lever 35 is articulated which is in turn articulated on an angle lever 36 which is rotatable about a pivot point 37. On the free end of the angle lever 36 engages a piston-cylinder arrangement 38 which is mounted on an upper plate 40 which is connected to the support plate 12 through a vertical web 39 and the side plates 39a. The support plate 12 is braced on the longitudinal struts 41 which are held through transverse members 52 on longitudinal supports 41a and are so connected to the body of the machine.

In known manner, the blower nozzle 27 is provided with a blower air feed 42; The test nozzle 28 is provided with a feed line 43 for the test air and a filling nozzle 30 is provided with a filling line 44 for introduction of the medium which is to be filled into the hollow bodies. It also has a vent line 44a so that the air located in the bottle 29 can escape during filling. The shank of the test nozzle 28 is secured on the piston 45 of a cylinder 46, while the shank of the filling nozzle 30 is secured on the piston 47 of a cylinder 48. The cylinders 46 and 48 are provided with feed pipes 49 and 50 through which the test nozzle 28 and the filling nozzle 30 can if required be raised or lowered. Disposed on the end faces of the test nozzle 28 and of the filling nozzle 30 are seals 51 by which the test nozzle 28 and filling nozzle 31 can rest in seal-tight manner on the neck of the bottle 29.

FIG. 1 shows the blowing machine according to the invention in a position in which an inflated bottle 29 has been brought in position in the test apparatus 7 by the blower nozzle 27 while a tested bottle 29a is brought into position in the filling apparatus by the test nozzle 28. The mould closure means is closed. A hose-shaped blank 3 extruded from the nozzle 12 is located in the blowing mould 6. The plate 31 is lifted with the piston-cylinder arrangement 38, so that the nozzles 27 and 28 are withdrawn from the bottles 29, 29a. At the same time, the hose 3 is separated in known manner beneath the hose nozzle 2. With the carrier 31 raised, the closing means 4, 5 are moved rightwards into the position shown in FIG. 3 in which the blower nozzle 27 is situated over the blower mould 7, the test nozzle 28 is above the test apparatus 7 and the filling nozzle 30 is above the filling apparatus 8. Once the mould closure means 4, 5 have reached this position, the carrier 31 is lowered, the blower nozzle 37 entering the hose-shaped blank 3 and the filling nozzle 30 entering the tested bottle 29a. Upon lowering of the carrier 31, due to actuation of the cylinder 45, 46, the test nozzle 28 is guided upwardly into the position shown in FIG. 4 so that the neck waste 17 on the inflated bottle 29 can be removed. This is done by operating the striker 31 shown in FIG. 4. Once the striker 13 has been returned to its inoperative position, operation of the cylinder 45, 46 in the opposite direction introduces the test nozzle 28 into the blown bottle 29 which is to be tested, its seal 51 resting on the neck aperture of the bottle 29. The test for tightness is carried out by introducing air pressure into the bottle 29 through the pipe 43. If the test pressure is retained in the bottle 29, then the bottle 29 is subsequently subjected to negative pressure through the pipe 43 before the mould closure means 4, 5 are opened. The tested bottle 29a is filled through the filling nozzle 28 via the pipe 43, the air present in the bottle being simultaneously carried away through the pipe 44a.

The bottles which are established as being leaky in the test apparatus 7 are not subjected to the negative pressure but, after venting, are exposed to a surge of air while the mould is open, the air ejecting them downwardly as rejects. In timing, the operations of inflating the blank 3 into a bottle, the carrying out of the testing of the bottle 29 in the test apparatus 7 and the filling operation carried out on the tested bottle 29a are attuned to one another in the filling apparatus so that upon opening of the mould closure means 4, 5, an inflated bottle 29 is present in the blowing mould while a tested bottle 29a is present in the test apparatus 7. Immediately prior to opening of the mould, the filling nozzle 30 is removed from the mouth of the bottle 29a by operation of the cylinder 47, 48. The filled bottle 29a is resting on the fork 20 which, after opening of the mould, lowers, the fork members passing between the cords of the conveyor belt 22 and so allowing the filled bottle 29a to be transported away.

In the case of the embodiment shown in FIG. 4, in contrast to FIGS. 1 to 3, the mould closure means 4, 5 are fixed while the extruder 1 is transversely and vertically movable. In the case of a fixed mould closure means 4, 5, the carrier plate 12 with the carrier 31 must be transversely displaceable, so that the nozzle 27, 28 and the filling nozzle 30 can be operated in the aforedescribed manner by raising and lowering of the carrier 31 and by actuation of the cylinders 45, 46 and 47, 48. For this purpose, the carrier plate 12 is disposed for longitudinal displacement on the struts 41. Mounted on the transverse carrier 52 is the cylinder of a piston-cylinder arrangement 53, while the end of the piston engages on the web plate 54 which is mounted on the carrier plate 12. By corresponding operation of the piston-cylinder arrangement, the carrier plate 12 with the carrier 31 and its actuating means 38 are in the same way displaced in respect of the fixed mould closure means 4, 5 as the mould closure means 4, 5 are displaced in respect of the fixed carrier plate 12 in the case of the embodiments shown in FIGS. 1 to 3.

I claim:

1. In apparatus for producing hollow bodies in which a tubular-shaped blank is inflated in a mould within mould closure means alongside an extruder, characterized in that the mould closure means is provided with a blowing mould wherein said blank is inflated, test means for a leakproof test on a hollow body and preferably additional means for filling a satisfactory tested hollow body, said blowing mould, said test means and said filling means each consisting of two halves, said halves being simultaneously movable between an open position and a closed position by said mould closure means, said blowing mould, said test means and said filling means being at equal distances from one another; and in that carrier means movable in relation to said closure means is provided on a transverse member over said closure means, said carrier means being provided with a blower nozzle, a test nozzle and a filling nozzle situated in spaced relationship on the carrier means, said spacing corresponding to the spacing of said blowing mould, test means and filling means said blower nozzle being adapted to move a hollow body from said blowing mould to said test mould and said test nozzle being adapted to transfer a satisfactorily tested body to said filling means, when said halves are in the open position.

2. In apparatus according to claim 1, wherein said carrier means is movable in a vertical direction relative to the mould closure means and wherein the test nozzle and the filling nozzle are each further independently movable in a vertical direction relative to each other and relative to the carrier means.

3. In apparatus according to claim 1, wherein means for removing waste from a hollow body is provided on the test means.

4. In apparatus according to claim 2, wherein the carrier means is guided for vertical movement relative to the mould closure means on vertical struts on a transverse member and wherein a piston-cylinder arrangement is provided acting between said struts and the carrier means for effecting said vertical movement of the carrier means.

5. In apparatus according to claim 1, wherein a piston-cylinder arrangement is provided for each of the test nozzles and the filling nozzle and the test nozzle and filling nozzle is each provided with a shank mounted on a piston of said piston-cylinder arrangement.

6. In apparatus according to claim 1, wherein the test means is provided with a porous inner lining for enclosing a hollow body being tested in the test means.

7. In apparatus according to claim 1, wherein the filling means is provided with jaws for supporting a neck region of a bottle, and wherein a lowerable fork is provided for supporting the bottom of the bottle, and for lowering a filled bottle onto conveyor means provided at the bottom of said filling means.

8. In apparatus according to claim 7, wherein said conveyor means comprises round-section cord running on rollers.

9. In apparatus according to claim 1, wherein a support plate is provided beneath the carrier means, and means for removal of neck waste from a bottle is provided attached to said support plate.

10. In apparatus according to claim 9, wherein the means for removal of neck waste includes an arm pivotally mounted on said support plate.

11. In apparatus according to claim 1, wherein the carrier means is fixed in a horizontal direction and the mould closure means is movable relative to the carrier means in a horizontal direction.

12. In apparatus according to claim 1, wherein the mould closure means is situated in a fixed position in said apparatus and the carrier means is mounted for vertical movement and horizontal movement relative to the mould closure means.

13. In apparatus according to claim 12, wherein a support plate is provided beneath the carrier means, and means for removal of neck waste from a bottle is provided attached to said support plate and wherein said support plate is mounted for horizontal movement relative to the mould closure means.

* * * * *

UNITED STATES PATENT OFFICE
CERTIFICATE OF CORRECTION

Patent No. 3,728,063　　　　　　　　Dated April 17, 1973

Inventor(s) Erhard Langecker

It is certified that error appears in the above-identified patent and that said Letters Patent are hereby corrected as shown below:

On the Title page of the patent, the following information should be added: --Foreign Application Priority Data Apr. 24, 1970 Germany......P 20 21 019.9

Signed and sealed this 18th day of December 1973.

(SEAL)
Attest:

EDWARD M. FLETCHER, JR.
Attesting Officer

RENE D. TEGTMEYER
Acting Commissioner of Patents